US012195008B2

(12) United States Patent
Maeda et al.

(10) Patent No.: US 12,195,008 B2
(45) Date of Patent: Jan. 14, 2025

(54) INFORMATION RECORDING AND REPRODUCTION DEVICE, A NON-TRANSITORY STORAGE MEDIUM, AND INFORMATION RECORDING AND REPRODUCTION SYSTEM

(71) Applicant: Toyota Jidosha Kabushiki Kaisha, Toyota (JP)

(72) Inventors: Atsushi Maeda, Nagoya (JP); Yuma Ishihara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 342 days.

(21) Appl. No.: 17/119,447

(22) Filed: Dec. 11, 2020

(65) Prior Publication Data
US 2021/0197835 A1 Jul. 1, 2021

(30) Foreign Application Priority Data
Dec. 25, 2019 (JP) .................................. 2019-234640

(51) Int. Cl.
*B60W 40/09* (2012.01)
*G01C 21/36* (2006.01)
*G06N 20/00* (2019.01)
*G06V 20/59* (2022.01)

(52) U.S. Cl.
CPC ......... *B60W 40/09* (2013.01); *G01C 21/3617* (2013.01); *G06N 20/00* (2019.01); *G06V 20/597* (2022.01); *B60W 2540/229* (2020.02)

(58) Field of Classification Search
CPC ............ B60W 40/09; B60W 2540/229; G01C 21/3617; G06N 20/00; G06V 20/597
See application file for complete search history.

(56) References Cited

U.S. PATENT DOCUMENTS

| 2014/0247343 | A1* | 9/2014 | Chen ..................... H04N 5/272 348/135 |
| 2018/0257659 | A1* | 9/2018 | Nguyen ............... G07C 5/0816 |
| 2019/0221052 | A1* | 7/2019 | Kitazawa ................. G08G 1/00 |
| 2020/0086788 | A1* | 3/2020 | Pivnicka ................ B60K 35/00 |
| 2021/0101605 | A1* | 4/2021 | Nakamura ............ B60W 40/09 |
| 2021/0124962 | A1* | 4/2021 | Kim .................... G06V 10/7784 |

FOREIGN PATENT DOCUMENTS

| CN | 103813139 A | 5/2014 |
| CN | 205788318 U | 12/2016 |
| JP | 2008186174 A | 8/2008 |

(Continued)

OTHER PUBLICATIONS

WO-2016027412 Patentscope translation (Year: 2016).*

*Primary Examiner* — Joan T Goodbody
(74) *Attorney, Agent, or Firm* — Dinsmore & Shohl LLP

(57) ABSTRACT

An information recording and reproduction device includes a processor including hardware and configured to: acquire first information indicating information relating to a behavior of a driver from a first device mounted in a vehicle; acquire second information indicating information relating to a behavior of the vehicle from a second device mounted in the vehicle; and accumulate the first information and the second information in a memory in a synchronously reproducible manner.

17 Claims, 4 Drawing Sheets

(56) References Cited

FOREIGN PATENT DOCUMENTS

| JP | 2014-044691 A | | 3/2014 | |
|----|----|----|----|----|
| JP | 2014044691 | * | 3/2014 | ............... G08G 1/00 |
| JP | 2018180983 A | | 11/2018 | |
| WO | WO-2016027412 A1 | * | 2/2016 | ............. A61B 5/107 |
| WO | WO 2017171005 | * | 10/2017 | ........... G06V 10/772 |

* cited by examiner

INFORMATION RECORDING AND REPRODUCTION DEVICE, A NON-TRANSITORY STORAGE MEDIUM, AND INFORMATION RECORDING AND REPRODUCTION SYSTEM

CROSS-REFERENCE TO RELATED APPLICATIONS

This application claims priority to Japanese Patent Application No. 2019-234640 filed on Dec. 25, 2019, which is incorporated herein by reference in its entirety including the specification, drawings and abstract.

BACKGROUND

1. Technical Field

The present disclosure relates to an information recording and reproduction device, a non-transitory storage medium, and an information recording and reproduction system.

2. Description of Related Art

Japanese Unexamined Patent Application Publication No. 2014-044691 (JP 2014-044691 A) discloses a drive recorder system that includes cameras provided inside and outside of a vehicle cabin, and that issues an alert (warning) and records the inside of the vehicle cabin when the drive recorder system detects an abnormal behavior of a driver, such as falling asleep.

SUMMARY

There has been a demand for a technique that facilitates analysis of the cause of an abnormal behavior of a driver.

The present disclosure provides an information recording and reproduction device, an information recording and reproduction program, and an information recording and reproduction system that allow acquisition of data that facilitates analysis of the cause of the abnormal behavior.

An information recording and reproduction device according to the present disclosure includes a processor including hardware. The processor is configured to: acquire first information indicating information relating to a behavior of a driver from a first device mounted in a vehicle; acquire second information indicating information relating to a behavior of the vehicle from a second device mounted in the vehicle; and accumulate the first information and the second information in a memory in a synchronously reproducible manner.

An non-transitory storage medium according to the present disclosure stores instructions that are executable by one or more processors including hardware and that cause the one or more processors to perform functions including: acquiring first information indicating information relating to a behavior of a driver from a first device that is mounted in a vehicle; acquiring second information indicating information relating to a behavior of the vehicle from a second device mounted in the vehicle; and accumulating the first information and the second information in a memory provided for an information recording and reproduction device in a synchronously reproducible manner.

An information recording and reproduction system according to the present disclosure includes: a first device including a first processor that includes hardware, is mounted in a vehicle, and is configured to transmit first information indicating information relating to a behavior of a driver; a second device including a second processor that includes hardware, is mounted in the vehicle, and is configured to transmit second information indicating information relating to a behavior of the vehicle; and a server including a third processor. The third processor includes hardware, and is configured to acquire the first information from the first device, acquire the second information from the second device and accumulate the first information and the second information in a memory in a synchronously reproducible manner.

According to the present disclosure, it is possible to reproduce the vehicle behavior information and the driver behavior information at a later timing in synchronization with each other. This makes it possible to facilitate analysis of a cause of the abnormal behavior, which enhances usefulness of the information as the data for analysis.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
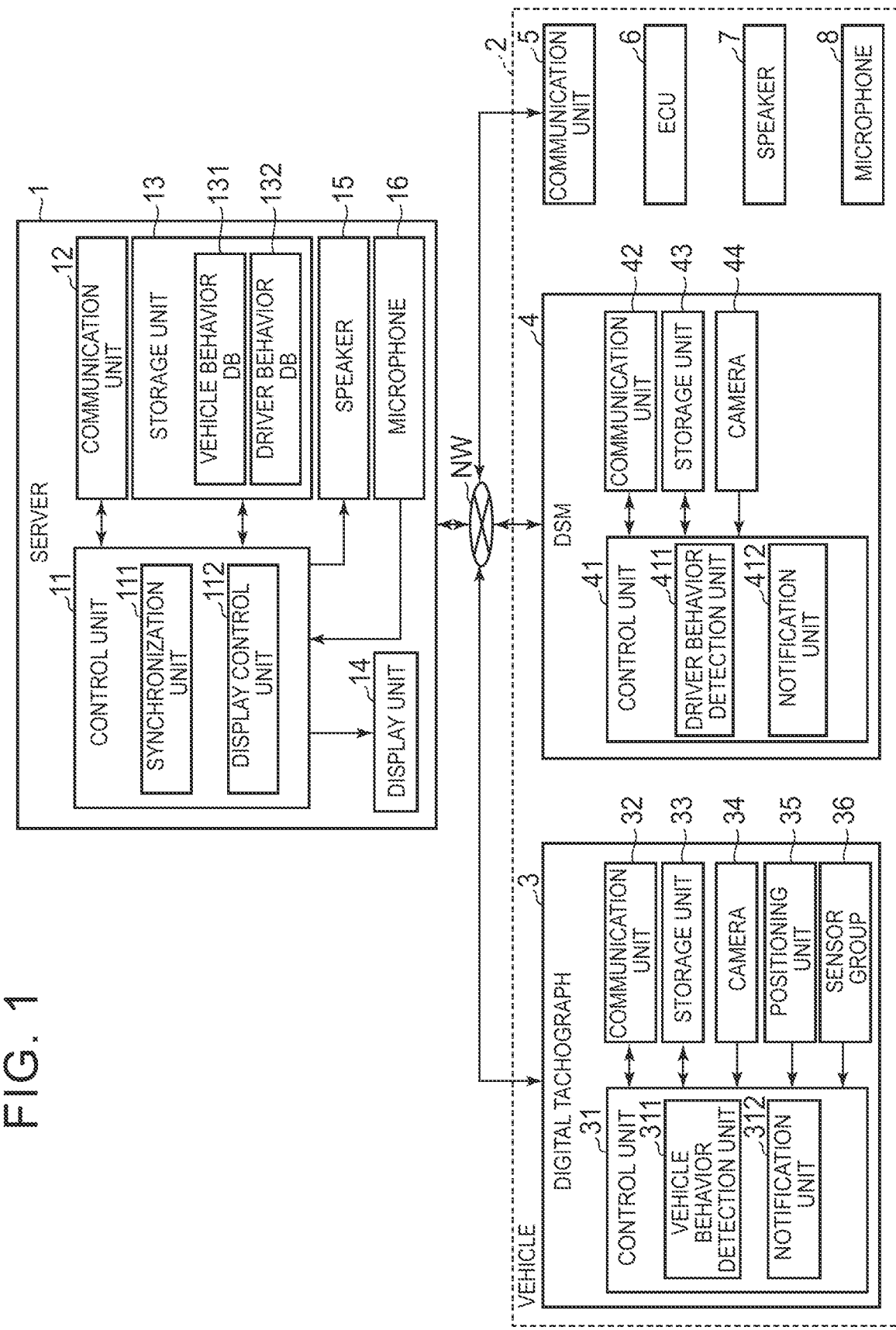
FIG. 1 is a block diagram schematically showing a configuration of an information recording and reproduction system including an information recording and reproduction device according to a first embodiment.

An information recording and reproduction device, an information recording and reproduction program, and an information recording and reproduction system according to a first embodiment of the present disclosure will be described with reference to FIGS. 1 to 3. Note that, constituent elements of embodiments below include elements that can be replaced and easily achieved by those who skilled in the art and elements that are substantially identical.
Information Recording and Reproduction System The information recording and reproduction system including the information recording and reproduction device according to the first embodiment will be described with reference to FIG. 1. The information recording and reproduction system is a system for accumulating and reproducing output data from an on-board device. As shown in FIG. 1, the information recording and reproduction system includes a server 1, a digital tachograph 3, and a driver status monitor (hereinafter referred to as "DSM") 4. Specifically, the information recording and reproduction system according to the first embodiment is realized by the server 1.

The digital tachograph 3 and the DSM 4 are mounted in a vehicle 2 as on-board devices. The vehicle 2 is a moving body that is communicable with the outside, and includes a communication unit 5, an electronic control unit (ECU) 6, a speaker 7, and a microphone 8, in addition to the digital tachograph 3 and the DSM 4. Although only one unit of the vehicle 2 is shown in FIG. 1, a plurality of the vehicles 2 may be provided.

The server 1, the digital tachograph 3, the DSM 4, and the communication unit 5 of the vehicle 2 are configured to be communicable with each other via a network NW. The network NW is configured of the Internet and a mobile phone network, for example.

Server

The server 1 acquires data (e.g. vehicle behavior information (second information)) output from the digital tachograph (second device) 3 and data (e.g. driver behavior information (first information)) output from the DSM (first device) 4 via the network NW, accumulates the output data above in a synchronously reproducible state, and reproduces the data in synchronization with each other. The server 1 includes a control unit 11, a communication unit 12, a storage unit 13, a display unit (display) 14, a speaker 15, and a microphone 16.

Specifically, the control unit 11 includes a processor having a central processing unit (CPU), a digital signal processor (DSP), and a field-programmable gate array (FPGA), etc., and a memory (main storage unit) having a random access memory (RAM) and a read-only memory (ROM), etc.

The control unit 11 realizes a function that matches a predetermined purpose by loading a program stored in the storage unit 13 to a workspace of the main storage unit, executing the program, and controlling each constituent unit through execution of the program. The control unit 11 functions as a synchronization unit 111 and a display control unit 112 through execution of the program.

The synchronization unit 111 accumulates the vehicle behavior information and the driver behavior information received via the network NW in the storage unit 13 in a synchronously reproducible manner. After receiving (acquiring) the vehicle behavior information from the digital tachograph 3 and the driver behavior information from the DSM 4, the synchronization unit 111 synchronizes the vehicle behavior information with the driver behavior information in terms of time based on time information included in the vehicle behavior information and the driver behavior information and accumulates the synchronized information in the storage unit 13.

Here, the vehicle behavior information is information that relates to behaviors of the vehicle 2 and is generated by the digital tachograph 3. The vehicle behavior information includes sensor values such as a vehicle speed, an angular velocity, an inter-vehicle distance with surrounding vehicles, and gravitational acceleration (G) values (front-rear G, right-left G, and vertical G) that are detected by a sensor group 36, a vehicle position (coordinate) detected by a positioning unit 35, information relating to whether an abnormal behavior of the vehicle 2 occurs, and the time information. Examples of the abnormal behavior of the vehicle 2 include rapid acceleration, steep turn, rapid approach to the surrounding vehicle, or crossing over a lane marking line by the vehicle 2. The digital tachograph 3 outputs a video image (image) that is captured by cameras 34 and the vehicle behavior information above to the synchronization unit 111 of the server 1.

The driver behavior information is information that relates to behaviors of the driver of the vehicle 2 and is generated by the DSM 4. The driver behavior information includes information on whether there is an abnormal behavior of the driver, such as looking away by the driver (the driver looks aside), closure of the driver's eyes (falling asleep), shaking of the driver's head, and disturbance in a driving posture of the driver. The DSM 4 outputs a video image (image) captured by a camera 44 and the driver behavior information above to the synchronization unit 111 of the server 1.

A transport vehicle and a route bus that travel along a determined route at a determined time, for example, are assumed as the vehicle 2 that is operated with the information recording and reproduction system according to the first embodiment. That is, a professional driver who specializes in driving is assumed as the driver of the vehicle 2. Therefore, it can be said that the vehicle behavior information and the driver behavior information are information that is received from the vehicle 2 that repeatedly travels the same route at the same time (in the same time of day).

The display control unit 112 synchronizes the vehicle behavior information with the driver behavior information and causes the display unit 14 to display the synchronized information. FIG. 2 shows an example of a display screen 9 that the display control unit 112 causes the display unit 14 to display. The display screen 9 is configured to include, for example, an image display region 91 that displays the video image captured by the camera 34 that captures video images of the driver in the vehicle 2 (hereinafter referred to as an "in-vehicle video image") among the cameras 34 provided for the digital tachograph 3, an operation region 92 in which an operation to reproduce the in-vehicle video image is possible, a driver behavior information display region 93 that displays the driver behavior information, and a vehicle behavior information display region 94 that displays the vehicle behavior information. The image display region 91 in FIG. 2 displays the in-vehicle video image. However, the image display region 91 may display a video image captured by the camera 34 that captures images outside the vehicle 2 (hereinafter referred to as "external video image") among the cameras 34 provided for the digital tachograph 3. Further, the display control unit 112 may display a switching button, etc., in the image display region 91 to switch between the in-vehicle video image and the external video image.

The display control unit 112 displays, for example, the in-vehicle video image of a driver Dr seated on a driver's seat in the image display region 91. The display control unit 112 displays an operation button group 921 including, for example, a play button, a pause button, a stop button, a rewind button, and a fast forward button for the in-vehicle video images, and a seek bar 922 in the operation region 92. The operation button group 921 and the seek bar 922 are operable by a pointing device such as a mouse. A movable direction of the seek bar 922 (a right-left direction in FIG. 2) is consistent with a time axis direction. Therefore, the in-vehicle video image corresponding to a certain time point can be displayed in the image display region 91 by moving the seek bar 922 to the right and to the left.

When the display control unit 112 synchronizes the vehicle behavior information with the driver behavior information and displays the synchronized information on the display unit 14, the display control unit 112 applies different colors to types of abnormal behaviors (e.g. looking away by the driver, closure of the driver's eyes, shaking of the driver's head, and disturbance in the driving posture of the driver) and displays a section in which an abnormal behavior of the driver occurs in accordance with the color applied to the abnormal behavior. As shown in FIG. 2, for example, the display control unit 112 displays regions that are partitioned by a predetermined time in a grid pattern side by side in a time axis direction in the driver behavior information display region 93, and the grids are displayed with different colors in accordance with the types of abnormal behaviors. For example, the color in the grid in a portion A in FIG. 2 indicates that the driver closes his or her eyes. As described above, the sections in which the abnormal behaviors of the driver occur are displayed in different colors in accordance with the type of abnormal behaviors. This makes it possible to understand the abnormal behaviors of the driver at a glance.

Figure 2:
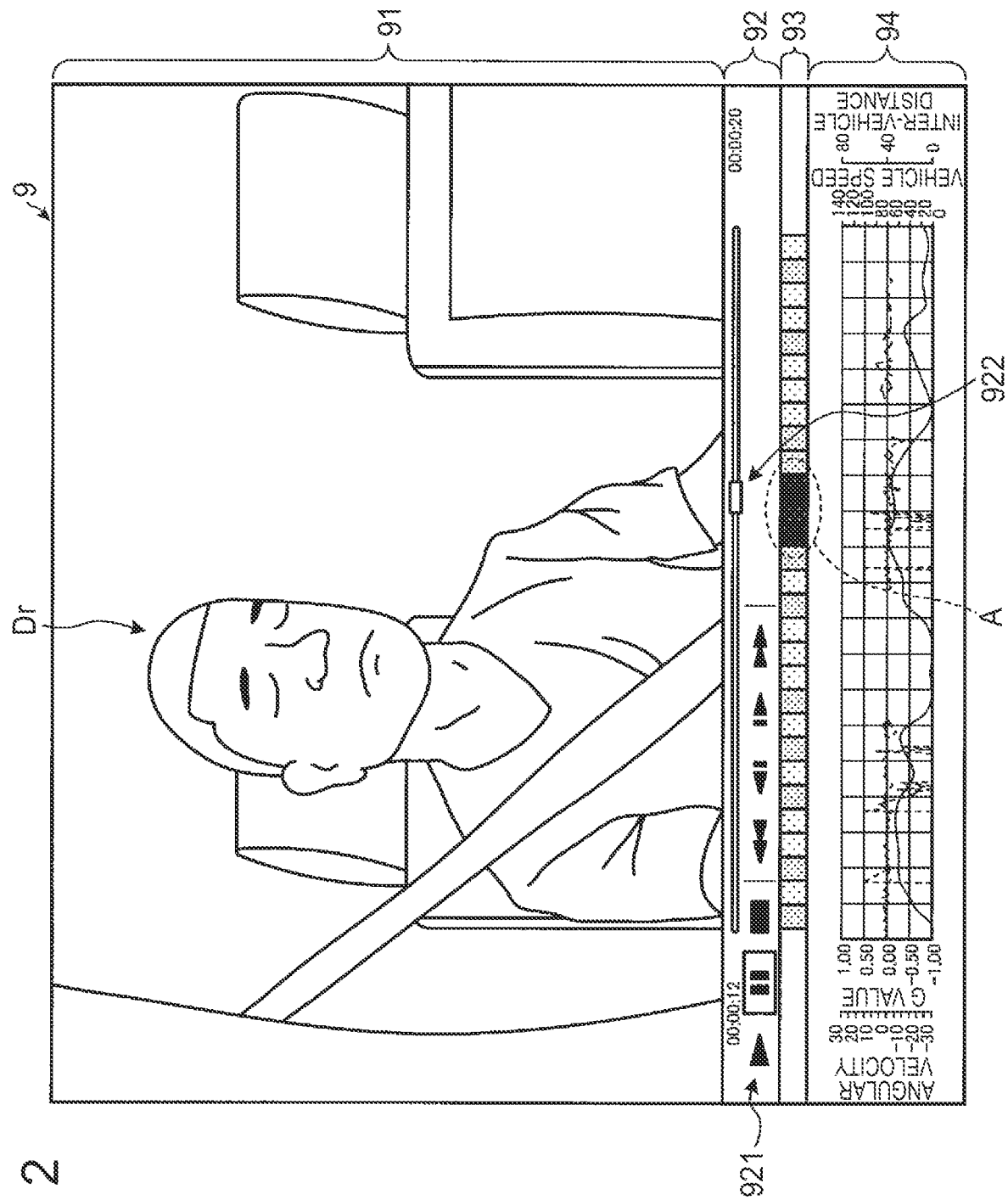
FIG. 2 is a diagram showing an example of a display screen that is displayed on a display unit by a display control unit of the information recording and reproduction device according to the first embodiment.
Figure 3:
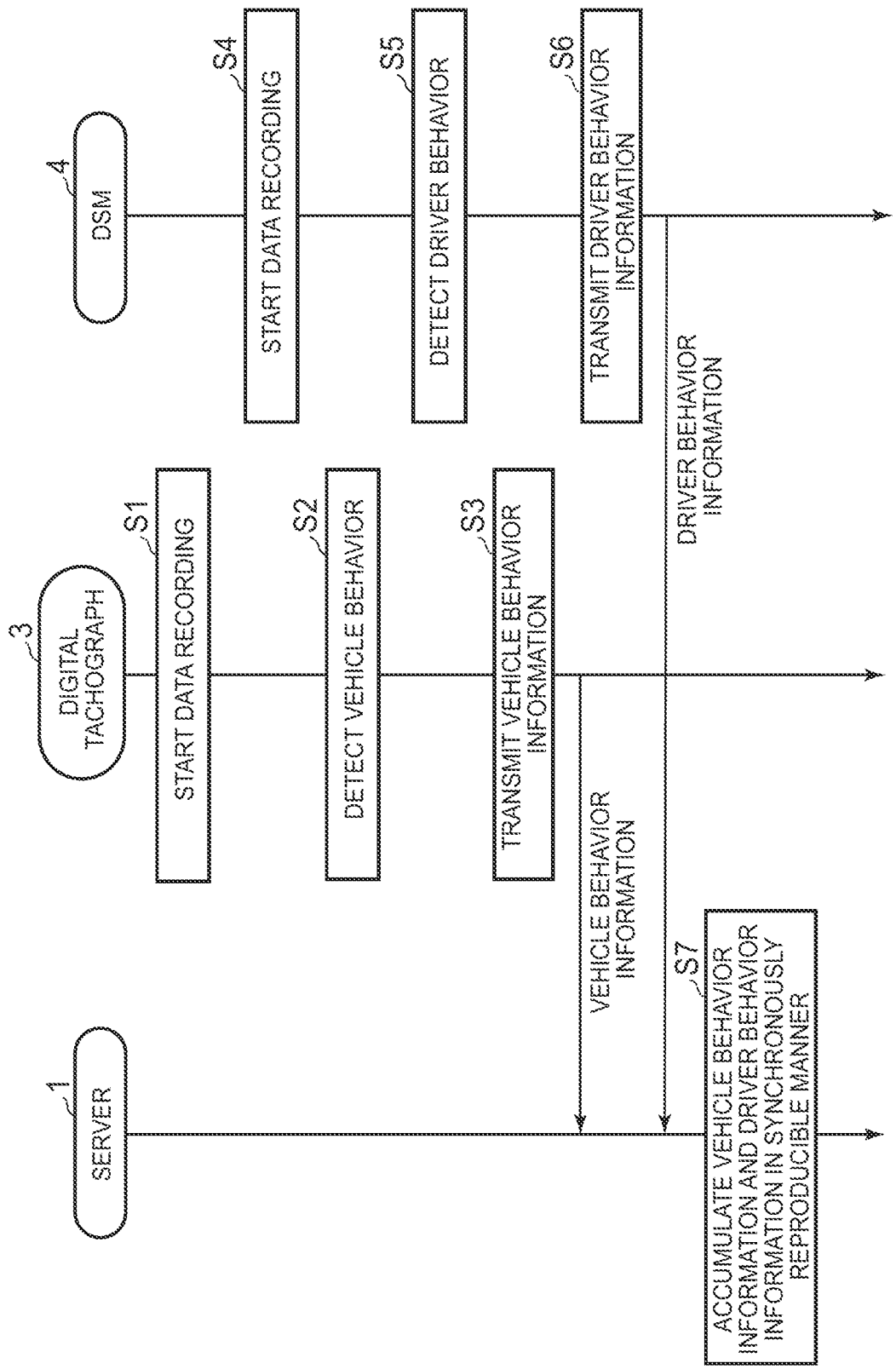
FIG. 3 is a flowchart showing a processing procedure of the information recording and reproduction method performed by the information recording and reproduction system according to the first embodiment.

As shown in FIG. 2, for example, the display control unit 112 displays a graph indicating the information on, for example, the vehicle speed, the angular velocity, the inter-vehicle distance with the surrounding vehicle, and the G values in the vehicle behavior information display region 94. Further, the display control unit 112 may display, for example, coordinates of the vehicle position on a map, or display the sections in which the abnormal behaviors of the vehicle 2 occur using different colors in accordance with the types of abnormal behaviors (e.g. rapid acceleration, steep turn, rapid approach to the surrounding vehicle, or crossing over the lane marking line by the vehicle 2), in addition to the graph shown in FIG. 2. As described above, displaying the behavior of the vehicle 2 in a graph or displaying the sections in which the abnormal behaviors of the vehicle 2 occur using different colors makes it possible to understand the abnormal behaviors of the vehicle 2 at a glance.

When the display control unit 112 synchronizes the vehicle behavior information with the driver behavior information and displays the synchronized information on the display unit 14, the display control unit 112 may display only the section in which the abnormal behavior of the driver included in the driver behavior information continues. That is, as shown in a portion A in FIG. 2, the display control unit 112 may extract the information and the video image of a portion in which the same abnormal behavior of the driver (e.g. closure of the eyes) continues and displays the extracted information and video image on the display unit 14. With this configuration, a user that administrates the server 1 (hereinafter referred to as an "operator") can preferentially check only the portion in which the abnormal behavior of the driver is highly likely to occur.

Moreover, when the display control unit 112 synchronizes the vehicle behavior information with the driver behavior information and displays the synchronized information on the display unit 14, the display control unit 112 may extract only the information and video image of the portion in which the abnormal behavior of the vehicle 2 included in the vehicle behavior information continues and display the extracted information and video image on the display unit 14. Consequently, the operator can preferentially check only the portion in which the abnormal behavior of the vehicle 2 is highly likely to occur.

The communication unit 12 is configured to include, for example, a local area network (LAN) interface board and a wireless communication circuit for performing wireless communication. The communication unit 12 is connected to the network NW such as the Internet that is a public communication network. The communication unit 12 is connected to the network NW to communicate with the digital tachograph 3, the DSM 4, and the communication unit 5 of the vehicle 2.

The storage unit 13 is configured to include a recording media such as an erasable programmable ROM (EPROM), a hard disk drive (HDD), and a removable media. Examples of the removable media includes a universal serial bus (USB) memory and disc recording medium such as a compact disc (CD), a digital versatile disc (DVD), and a Blu-ray (registered trademark) disc (BD). The storage unit 13 can store an operating system (OS), various programs, various tables, and various types of databases (DB), etc.

The storage unit 13 includes a vehicle behavior DB 131 and a driver behavior DB 132. The databases above are constructed in such a manner that a program of a database management system (DBMS) that is performed by the control unit 11 controls data to be stored in the storage unit 13.

The vehicle behavior DB 131 is configured to include a relational database in which the vehicle behavior information received from the digital tachograph 3 is stored in a searchable manner, for example. Further, the driver behavior DB 132 is configured to include a relational database in which the driver behavior information received from the DSM 4 is stored in a searchable manner, for example.

The display unit 14 is configured to include a liquid crystal display (LCD) or an organic electroluminescence display (OLED), for example. The display unit 14 displays the vehicle behavior information and the driver behavior information in synchronization with each other based on the control executed by the display control unit 112. The display unit 14 is also capable of displaying the vehicle behavior information and the driver behavior information in synchronization with each other in real time based on the control executed by the display control unit 112, or is capable of displaying the vehicle behavior information and the driver behavior information that are stored in the storage unit 13 at different timings while synchronizing the vehicle behavior information with the driver behavior information at a later timing.

The speaker 15 is an output unit that outputs voice information to the operator that administrates the server 1. The speaker 15 is used when the operator has a dialogue with the driver of the vehicle 2 via the network NW, for example. In addition, the speaker 15 may be used for the purpose of notifying the operator of an alert when the abnormal behavior of the vehicle 2 or of the driver occurs.

The microphone 16 is an input unit that receives a voice input from the operator. The microphone 16 is used when the operator has a dialogue with the driver of the vehicle 2 via the network NW, for example.

The digital tachograph (vehicle information acquisition unit) 3 includes a control unit 31, a communication unit 32, a storage unit 33, the cameras 34, a positioning unit 35, and the sensor group 36. The control unit 31, the communication unit 32, and the storage unit 33 are physically the same as the control unit 11, the communication unit 12, and the storage unit 13. The control unit 31 functions as a vehicle behavior detection unit 311 and a notification unit 312 through execution of a program stored in the storage unit 33.

The vehicle behavior detection unit 311 detects whether the behavior of the vehicle 2 (e.g. the vehicle speed, the angular velocity, the inter-vehicle distance with the surrounding vehicle, the G value, and the vehicle position) and whether the abnormal behavior of the vehicle 2 (e.g. rapid acceleration, steep turn, rapid approach to the surrounding vehicle, or crossing over the lane marking line by the vehicle 2) occurs based on the sensor data input from the sensor group 36.

The vehicle behavior detection unit 311 sets a threshold (second determination criteria) in terms of the vehicle speed, the angular velocity, the inter-vehicle distance with the surrounding vehicle, the G value, and a distance to the lane marking line, for example. The vehicle behavior detection unit 311 determines that the abnormal behavior of the vehicle 2 occurs when the sensor data input from the sensor group 36 exceeds the threshold or based on a time elapsed after the threshold is exceeded.

The notification unit 312 notifies the driver of the alert via the speaker 7 mounted in the vehicle 2 when the vehicle behavior detection unit 311 detects the abnormal behavior of the vehicle 2. Note that the notification unit 312 may output a voice prompting correction of the abnormal behavior (e.g. voice indicating that "the vehicle crosses over the lane marking line" when the vehicle crosses over the lane marking line) instead of the alert. Moreover, the digital tachograph 3 itself may include a speaker, and an alert or a voice may be output from the speaker.

The cameras 34 each are, for example, a camera having a built-in imaging element, such as a charge coupled device (CCD) or a CMOS image sensor (CIS). The cameras 34 are disposed inside and outside a vehicle cabin, and are each disposed at a position at which an image forward of the vehicle 2 can be captured, a position at which an image rearward of the vehicle 2 can be captured, and a position at which an image of the driver in the vehicle 2 can be captured, for example. The cameras 34 output the captured video image (image) data to the vehicle behavior detection unit 311.

The positioning unit 35 receives radio waves from a global positioning system (GPS) satellite and detects the vehicle position. A method of detecting the vehicle position is not limited to the method using the GPS satellite, and may be a method of combining light detection and ranging or laser imaging detection and ranging (LiDAR) and a three-dimensional digital map, etc.

The sensor group 36 is configured to include a vehicle speed sensor, an engine speed sensor, a G sensor, and a gyro sensor, etc. The sensor group 36 outputs the detected sensor data to the control unit 31.

The DSM (driver information acquisition unit) 4 includes a control unit 41, a communication unit 42, a storage unit 43, and the camera 44. The control unit 41, the communication unit 42, and the storage unit 43 are physically the same as the control unit 11, the communication unit 12, and the storage unit 13. The control unit 41 functions as a driver behavior detection unit 411 and a notification unit 412 through execution of a program stored in the storage unit 43.

The driver behavior detection unit 411 detects the abnormal behavior of the driver by analyzing the images captured by the camera 44. The driver behavior detection unit 411 may use a machine learning technique such as deep learning when the driver behavior detection unit 411 detects the abnormal behavior of the driver.

The driver behavior detection unit 411 sets a threshold (first determination criteria) in advance in terms of the angle of the driver's face, the degree of opening of the driver's eyes, and the positions of the driver's head and body, etc., that are analyzed based on the images, for example. The driver behavior detection unit 411 determines that the abnormal behavior of the driver occurs when the result of image analysis exceeds the threshold or based on a time elapsed after the threshold is exceeded.

The notification unit 412 notifies the driver of the alert via the speaker 7 mounted in the vehicle 2 when the driver behavior detection unit 411 detects the abnormal behavior of the driver. Note that the notification unit 412 may output a voice prompting correction of the abnormal behavior (e.g. voice indicating that "pay attention to the forward" when the driver looks aside) instead of the alert. Moreover, the DSM 4 itself may include a speaker, and an alert or a voice may be output from the speaker.

The camera 44 is, for example, an infrared camera, and is disposed at a position at which an image of the driver in the vehicle 2 can be captured. The camera 44 outputs the captured video image (image) data to the vehicle behavior detection unit 311.

The communication unit 5 is configured to include a data communication module (DCM), for example, and communicates with the server 1 by a wireless communication via the network NW. The ECU 6 executes a centralized control on operations of the constituent elements mounted in the vehicle 2. The speaker 7 and the microphone 8 are provided in the vehicle 2 and are physically the same as the speaker 15 and the microphone 16. The speaker 7 and the microphone 8 may be provided in each of the digital tachograph 3 and the DSM 4.

Information Recording and Reproduction Method

An information recording and reproduction method that is executed by the information recording and reproduction system according to the first embodiment will be described with reference to FIG. 3. A processing flow to be described below starts at a timing when an ignition switch of the vehicle 2 is switched from an off state to an on state, and the routine proceeds to step S1. Further, the processing (steps S1 to S3) by the digital tachograph 3 and the processing (steps S4 to S6) by the DSM 4 may be performed at different timings as shown in FIG. 3, or may be performed at the same timing.

First, the control unit 31 of the digital tachograph 3 starts data recording of the vehicle behavior information (step S1). The vehicle behavior detection unit 311 then detects the behavior of the vehicle 2 based on the sensor data input from the sensor group 36 (step S2). The vehicle behavior detection unit 311 then transmits the vehicle behavior information and the video image (image) captured by the cameras 34 to the server 1 (Step S3).

Subsequently, the control unit 41 of the DSM 4 starts data recording of the driver behavior information (step S4). The driver behavior detection unit 411 then detects the behavior of the driver based on the image input from the camera 44 (step S5). The driver behavior detection unit 411 then transmits the driver behavior information and the video image (image) captured by the camera 44 to the server 1 (Step S6).

Subsequently, the synchronization unit 111 of the server 1 accumulates the vehicle behavior information received from the digital tachograph 3 and the driver behavior information received from the DSM 4 in the storage unit 13 in a synchronously reproducible manner (step S7). With the flow above, the processing of the information recording and reproduction method ends.

As described above, with the information recording and reproduction device, the information recording and reproduction program, and the information recording and reproduction system according to the first embodiment, it is possible to reproduce the vehicle behavior information and the driver behavior information in synchronization with each other at a later timing. This makes it possible to facilitate analysis of the cause of the abnormal behavior, which enhances usefulness of the information as data for analysis. That is, by analyzing the behavior of the vehicle 2 and the behavior of the driver in association with each other, the cause of the abnormal behavior of the driver (for example, falling asleep) can be identified, which makes it possible to prevent occurrence of the abnormal behavior of the driver in advance.

Second Embodiment

Figure 4:
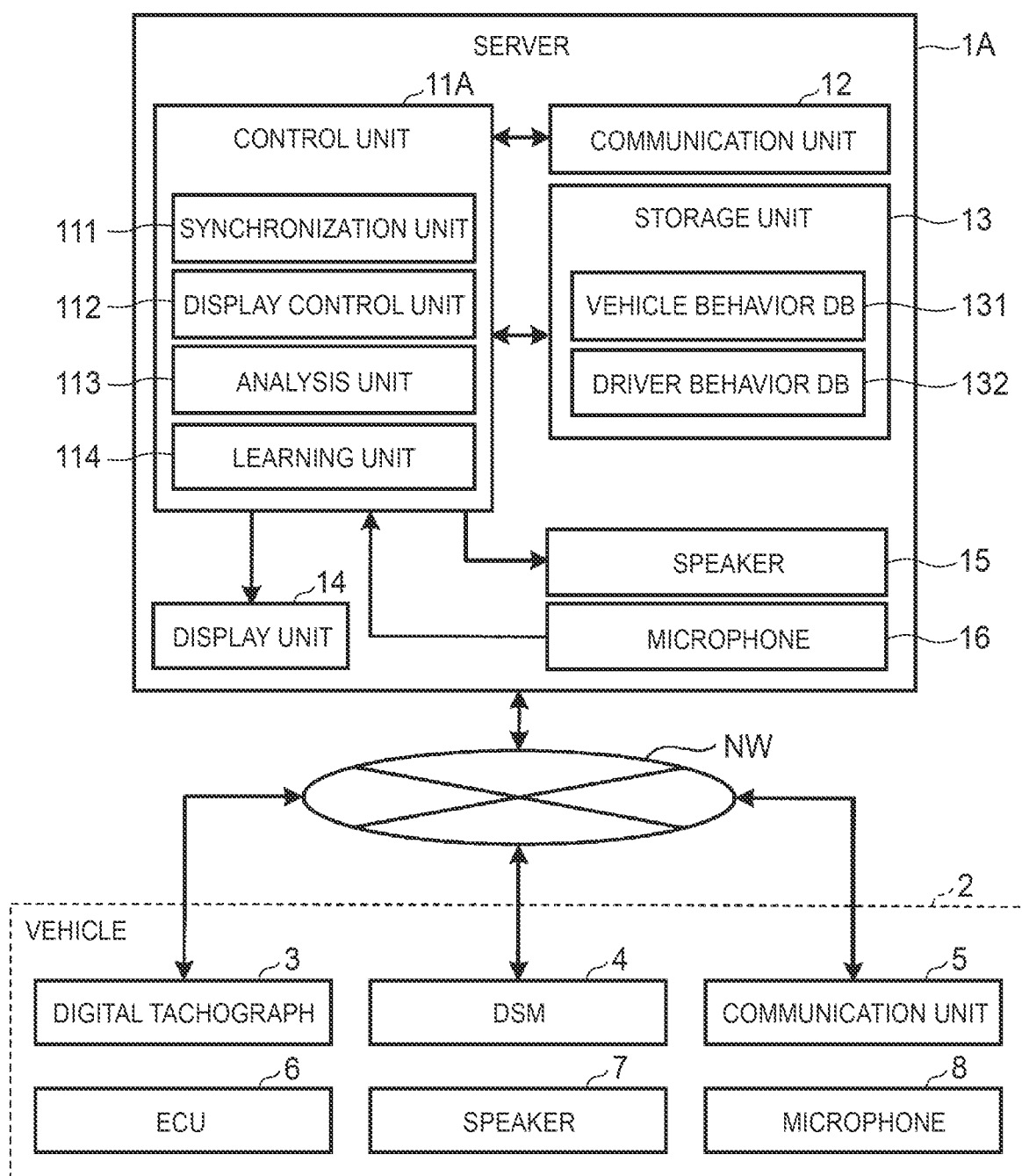
FIG. 4 is a block diagram schematically showing a configuration of an information recording and reproduction system including an information recording and reproduction device according to a second embodiment.

An information recording and reproduction device, an information recording and reproduction program, and an information recording and reproduction system according to a second embodiment of the present disclosure will be described with reference to FIG. 4.

Information Recording and Reproduction System

The information recording and reproduction system according the second embodiment has the configuration similar to the information recording and reproduction system according to the first embodiment except that the information recording and reproduction system includes a server 1A in place of the server 1. Therefore, only the configuration of the server 1A will be described below.

Server

The server 1A includes a control unit 11A, the communication unit 12, the storage unit 13, the display unit 14, the speaker 15, and the microphone 16. The control unit 11A is physically the same as the control unit 11. The control unit 11A functions as the synchronization unit 111, the display control unit 112, and an analysis unit 113, and a learning unit 114 through execution of the program stored in the storage unit 13.

Here, the vehicle behavior detection unit 311 of the digital tachograph 3 determines whether the abnormal behavior of the vehicle 2 occurs based on the predetermined first determination criteria (threshold). Further, the driver behavior detection unit 411 of the DSM 4 determines whether the abnormal behavior of the driver occurs based on the predetermined second determination criteria (threshold).

The analysis unit 113 according to the second embodiment analyzes the vehicle behavior information acquired from the vehicle behavior detection unit 311 and the driver behavior information acquired from the driver behavior detection unit 411, and changes the first determination criteria and the second determination criteria based on the analysis result. The analysis results of the vehicle behavior information and the driver behavior information are fed back to change the thresholds (first and second determination criteria) to be used when detecting the abnormal behavior. Accordingly, a detection accuracy of the abnormal behavior can be improved.

Further, the learning unit 114 according to the second embodiment performs machine learning of a relationship between the presence of the abnormal behavior of the driver that is determined by the driver behavior detection unit 411 of the DSM 4 and the presence of actual abnormal behavior so as to generate a learning model. The learning unit 114 then determines whether the abnormal behavior of the driver occurs using the learning model generated as above instead of the determination by the driver behavior detection unit 411. With this configuration, the detection accuracy of the abnormal behavior can be improved with a use of the learning model in which the relationship between the presence of the abnormal behavior of the driver that is determined and the presence of the actual abnormal behavior is learned.

As described above, with the information recording and reproduction device, the information recording and reproduction program, and the information recording and reproduction system according to the second embodiment, the detection accuracy of the abnormal behaviors of the vehicle 2 and of the driver is improved.

Further effects and modified examples can be easily derived by those skilled in the art. Therefore, the broader aspects of the present disclosure are not limited to the specific details and representative embodiments represented and described above. Accordingly, various modifications may be made without departing from the spirit and the scope of the present disclosure as defined by the appended claims and their equivalents.

For example, in the first and second embodiments, the synchronization timing of the vehicle behavior information and the driver behavior information is not specifically limited. In the first and second embodiments, the vehicle behavior information received from the digital tachograph 3 is synchronized with the driver behavior information received from the DSM 4 in terms of time, and the synchronized information is accumulated in the storage unit 13. However, the vehicle behavior information and the driver behavior information may be accumulated in the storage unit 13 in a state where the vehicle behavior information is not synchronized with the driver behavior information in terms of time, and may be synchronized at the time of reproduction. In this case, after the display control unit 112 reads the vehicle behavior information and the driver behavior information from the storage unit 13, the display control unit 112 synchronizes the vehicle behavior information with the driver behavior information in terms of time based on the time information included in the vehicle behavior information and the driver behavior information, and displays the synchronized information on the display unit 14.

What is claimed is:

1. An information recording and reproduction device comprising:
   a processor including hardware and configured to:
      acquire a video image of a driver from a first device mounted in a vehicle;
      determine first information relating to a behavior of the driver based on the video image;
      acquire second information indicating information relating to a behavior of the vehicle from a second device mounted in the vehicle;
      synchronize the first information and the second information based on time information included in the first information and the second information to generate synchronized information;
      display the synchronized information on a display screen that includes an image display region that displays the captured image of the driver, an operation region that includes a play button, a pause button, a stop button, a rewind button, a fast forward button, and a seek bar that can be used to reproduce the in-vehicle video image, a driver behavior information display region that displays the driver behavior information, and a vehicle behavior information display region that displays the vehicle behavior information;
      set a first threshold based on a vehicle speed, an angular velocity, an inter-vehicle distance with a surrounding vehicle, G value, and a distance to a lane marking;
      determine whether the first threshold has been exceeded based on the second information;
      upon determination that the first threshold has been exceeded, determine that abnormal behavior of the vehicle occurs;

set a second threshold based on an angle of the driver's face, a degree of opening of the driver's eyes, and positions of the driver's head and body;

determine whether the second threshold has been exceeded based on the video image;

upon determination that the second threshold has been exceeded, determine that abnormal behavior of the driver occurs; and change the first threshold and the second threshold based on an analysis result.

2. The information recording and reproduction device according to claim 1, further comprising a display configured to display the first information and the second information, wherein the processor is configured to display only a section in which an abnormal behavior of the driver that is included in the first information or an abnormal behavior of the vehicle that is included in the second information continues when the first information and the second information are synchronized with each other and displayed on the display.

3. The information recording and reproduction device according to claim 2, wherein the processor is configured to display a section in which the abnormal behavior of the driver occurs such that a color in accordance with a type of the abnormal behavior is applied to the section when the first information and the second information are synchronized with each other and displayed on the display.

4. The information recording and reproduction device according to claim 1, wherein the processor is configured to generate a learning model by performing machine learning of a relationship between a presence of the abnormal behavior of the driver that is determined by the first device and a presence of an actual abnormal behavior, and determine whether the abnormal behavior of the driver occurs using the learning model in place of the determination performed by the first device.

5. The information recording and reproduction device according to claim 1, wherein the first information and the second information are information that is acquired from a vehicle configured to repeatedly travel in a same route at a same time.

6. The information recording and reproduction device according to claim 2, wherein:
the first device is a driver status monitor including a camera configured to capture an image of the driver;
the second device is a digital tachograph including cameras and sensors provided inside and outside of a vehicle cabin; and
the abnormal behavior of the driver includes at least one of looking away by the driver, closure of eyes of the driver, shaking of a head of the driver, and a disturbance in a driving posture of the driver, and the abnormal behavior of the vehicle includes at least one of rapid acceleration, steep turn, rapid approach to a surrounding vehicle, and crossing over a lane marking line by the vehicle.

7. A non-transitory storage medium storing instructions that are executable by one or more processors including hardware and that cause the one or more processors to perform functions comprising:
acquiring a video image of a driver from a first device mounted in a vehicle;
determining first information relating to a behavior of the driver based on the video image;
acquiring second information indicating information relating to a behavior of the vehicle from a second device mounted in the vehicle;

accumulating synchronizing the first information and the second information based on time information included in the first information and the second information to generate synchronized information;

displaying the synchronized information on a display screen that includes an image display region that displays the captured image of the driver, an operation region that includes a play button, a pause button, a stop button, a rewind button, a fast forward button, and a seek bar that can be used to reproduce the in-vehicle video image, a driver behavior information display region that displays the driver behavior information, and a vehicle behavior information display region that displays the vehicle behavior information;

setting a first threshold based on a vehicle speed, an angular velocity, an inter-vehicle distance with a surrounding vehicle, G value, and a distance to a lane marking;

determining whether the first threshold has been exceeded based on the second information;

upon determination that the first threshold has been exceeded, determining that abnormal behavior of the vehicle occurs;

setting a second threshold based on an angle of the driver's face, a degree of opening of the driver's eyes, and positions of the driver's head and body;

determining whether the second threshold has been exceeded based on the video image;

upon determination that the second threshold has been exceeded, determining that abnormal behavior of the driver occurs; and changing the first threshold and the second threshold based on an analysis result.

8. The non-transitory storage medium according to claim 7, wherein the functions further comprises displaying only a section in which an abnormal behavior of the driver included in the first information or an abnormal behavior of the vehicle included in the second information continues on a display configured to display the first information and the second information when the first information and the second information are synchronized with each other and displayed on the display.

9. The non-transitory storage medium according to claim 8, wherein the functions further comprises displaying a section in which the abnormal behavior of the driver occurs such that a color in accordance with a type of the abnormal behavior is applied to the section when the first information and the second information are synchronized with each other and displayed on the display.

10. The non-transitory storage medium according to claim 7, wherein the functions further comprises:
generating a learning model by performing machine learning of a relationship between a presence of the abnormal behavior of the driver that is determined by the first device and a presence of an actual abnormal behavior; and
determining whether the abnormal behavior of the driver occurs using the learning model in place of the determination by the first device.

11. The non-transitory storage medium according to claim 7, wherein the first information and the second information are information that is acquired from a vehicle configured to repeatedly travel in a same route at a same time.

12. The non-transitory storage medium according to claim 8, wherein:
the first device is a driver status monitor including a camera configured to capture an image of the driver;

the second device is a digital tachograph including cameras and sensors provided inside and outside of a vehicle cabin; and the abnormal behavior of the driver includes at least one of looking away by the driver, closure of eyes of the driver, shaking of a head of the driver, and a disturbance in a driving posture of the driver, and the abnormal behavior of the vehicle includes at least one of rapid acceleration, steep turn, rapid approach to a surrounding vehicle, and crossing over a lane marking line by the vehicle.

13. An information recording and reproduction system comprising:
- a first device including a first processor that includes hardware, is mounted in a vehicle, and is configured to acquire a video image of a driver, determine first information relating to a behavior of driver based on the video image, and transmit the first information;
- a second device including a second processor that includes hardware, is mounted in the vehicle, and is configured to transmit second information indicating information relating to a behavior of the vehicle;
- a server including a third processor that includes hardware and is configured to acquire the first information from the first device, acquire the second information from the second device, and synchronize the first information and the second information based on time information included in the first information and the second information to generate synchronized information; and
- a display configured to display the synchronized information that includes an image display region that displays the captured image of the driver, an operation region that includes a play button, a pause button, a stop button, a rewind button, a fast forward button, and a seek bar that can be used to reproduce the in-vehicle video image, a driver behavior information display region that displays the driver behavior information, and a vehicle behavior information display region that displays the vehicle behavior information, wherein the first processor is configured to:
- set a first threshold based on a vehicle speed, an angular velocity, an inter-vehicle distance with a surrounding vehicle, G value, and a distance to a lane marking;
- determine whether the first threshold has been exceeded based on the second information;
- upon determination that the first threshold has been exceeded, determine that abnormal behavior of the vehicle occurs; and
- change the first threshold based on an analysis result;

the second processor is configured to:
- set a second threshold based on an angle of the driver's face, a degree of opening of the driver's eyes, and positions of the driver's head and body;
- determine whether the second threshold has been exceeded based on the video image;
- upon determination that the second threshold has been exceeded, determine that abnormal behavior of the driver occurs; and
- change the second threshold based on the analysis result.

14. The information recording and reproduction system according to claim 13, wherein:
the third processor is configured to display only a section in which an abnormal behavior of the driver that is included in the first information or an abnormal behavior of the vehicle that is included in the second information continues when the first information and the second information are synchronized with each other and displayed on the display.

15. The information recording and reproduction system according to claim 14, wherein the third processor is configured to display a section in which the abnormal behavior of the driver occurs such that a color in accordance with a type of the abnormal behavior is applied to the section when the first information and the second information are synchronized with each other and displayed on the display.

16. The information recording and reproduction system according to claim 13, wherein the third processor is configured to generate a learning model by performing machine learning of a relationship between a presence of the abnormal behavior of the driver that is determined by the first device and a presence of an actual abnormal behavior and determine whether the abnormal behavior of the driver occurs using the learning model in place of the determination performed by the first device.

17. The information recording and reproduction system according to claim 13, wherein the first information and the second information are information that is acquired from a vehicle configured to repeatedly travel in a same route at a same time.

* * * * *